April 2, 1935.    G. W. VEALE    1,996,221
BUMPER
Filed Jan. 27, 1932
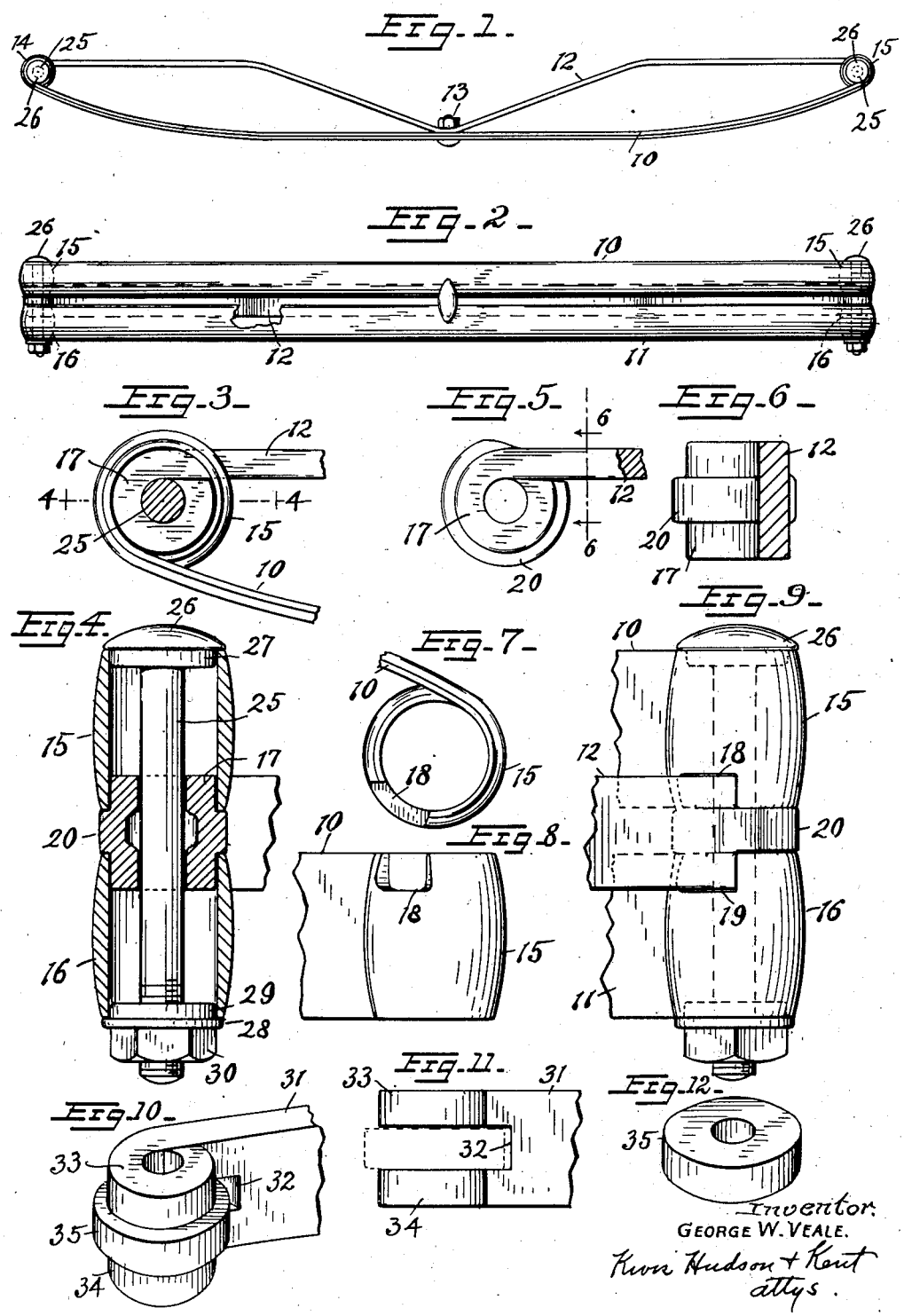
Inventor:
GEORGE W. VEALE.

Patented Apr. 2, 1935

1,996,221

UNITED STATES PATENT OFFICE 1,996,221

BUMPER

George W. Veale, Cleveland Heights, Ohio, assignor to Eaton Manufacturing Company, Cleveland, Ohio, a corporation of Ohio Application January 27, 1932, Serial No. 589,147

7 Claims. (Cl. 293—55)

This invention relates to an automobile bumper, and especially to an end construction adapted for use in bumpers employing a plurality of impact bars.

Various end constructions have been employed heretofore in bumpers having a plurality of impact bars, but they have not been entirely satisfactory as they have failed to keep the impact bars properly spaced apart, or have necessitated trimming down the end of the back bar so much that it was greatly weakened and easily broken in case of an impact. This latter condition is particularly true where it is desired to space the bars of the impact member relatively close together.

It is one of the objects of the present invention to provide a bumper end construction which is adapted to withstand great shocks.

Another object of the present invention is to provide a bumper end construction which will maintain the impact bars in properly spaced relation.

Another object of the present invention is to provide a bumper end construction which is economical to manufacture and easy to assemble.

Other objects of the invention and features of novelty will be apparent from the following description, taken in conjunction with the accompanying drawing, in which Fig. 1 is a top plan view of a bumper embodying my invention.

Fig. 2 is a front elevation view of the bumper shown in Fig. 1, with a part of one of the impact bars broken away.

Fig. 3 is an enlarged plan view of the end construction provided by my invention, with the head of the bolt removed;

Fig. 4 is an enlarged sectional view taken along the line 4—4 of Fig. 3.

Fig. 5 is an enlarged plan view of an end of the rear bar.

Fig. 6 is a section taken along the line 6—6 of Fig. 5.

Fig. 7 is an enlarged plan view of an end of one of the impact bars.

Fig. 8 is an elevation of an end of the impact bar shown in Fig. 7.

Fig. 9 is an enlarged rear elevation of the end construction employed on the bumpers shown in Figs. 1 and 2.

Fig. 10 is a perspective view of another form of rear bar end adapted for use in a bumper end construction embodying my invention.

Fig. 11 is an elevation view of the end of the bar shown in Fig. 10, and

Fig. 12 is a perspective view of the spacer employed in the end shown in Fig. 10.

Referring to the drawing, the bumper illustrated comprises an impact member constructed of a pair of bars 10 and 11, and a rear bar 12. The rear bar 12 is adapted to be secured to the side members of an automobile frame and may be curved to meet the impact member, as at 13, according to the common practice. The front and rear bars are also secured together at their ends, and this invention is directed to the means for securing these ends together. The invention, however, is not limited to the type of bumper shown, but is equally applicable to bumperettes as well as to bumpers employing a somewhat different arrangement of the bars.

Referring to Figs. 1 and 3, it will be seen that the ends of the bars 10 and 11 are coiled to form eyes 15 and 16, and that the ends of the rear bar are also coiled to form terminals or eyes 17 which are disposed between, and telescoped with, the eyes 15 and 16 on the impact bars. It will be seen that the eye on the rear bar is the full width of the bar.

As will be seen in Figs. 7, 8 and 9, the eyes 15 and 16 on the impact bars 10 and 11 have notches or recesses 18 and 19 cut in their adjacent edges to receive the edges of the rear bar. The eye 17 on the end of the rear bar is provided with a rib 20 forming abutments on which the eyes 15 and 16 are seated, these abutments also serving to accurately space the impact bar. The rib 20 may be formed by means of rolls or by a pair of forging dies, before the end of the bar is rolled up to form the eye 17.

A bolt 25, with a head 26 having a conical shoulder 27 adapted to fit inside the eye 15, is inserted in the eyes. The shank of the bolt is preferably of about the same diameter as the interior of the eye 17 on the back bar. A washer 28 having a conical shoulder 29 adapted to fit inside the eye 16, and a nut 30 are fitted on the lower end of the bolt. When the nut 30 is tightened the eyes 15 and 16 are tightly drawn against the sides of the rib 20 and the ends of the impact bars 10 and 11, and the rear bar 12 are thereby firmly secured together.

The rib 20 extends substantially the entire circumference of the eye 17 except where the bar 12 merges with the eye and preferably projects from the periphery of the eye 17 a distance approximately equal to the thickness of the edges of the impact bars. This rib may be made of any desired width, depending on the distance which it is desired to space the impact bars apart, while the height of the rib can be varied as desired. As the rib 20 is formed in the rear bar while the bar is hot and the metal plastic, and is, therefore, an integral part of the eye, it not only does not weaken the eye but actually strengthens it.

When the eyes 15 and 16 are clamped about the eye 17, the edges of the eyes 15 and 16 rest on the rib 20, throughout practically their entire circumference, it being understood that the notches 18 and 19 are deep enough to permit the edges of the eyes 15 and 16 to engage the rib 20. As the eyes 15 and 16 are tightly clamped against the rib 20 by the bolt 25 and nut 30 the bars cannot tilt relative to each other and, therefore, will always be properly spaced apart at all points.

A modified form of rear bar terminal adapted for use in a bumper end construction embodying my invention is shown in Figs. 10 and 11. In the construction therein illustrated the end of the rear bar 31 is slotted as at 32 and the portions adjacent the edges are coiled to form eyes 33 and 34. A large washer 35 is placed in the slot between the eyes 33 and 34. It will be seen that the washer 35 is of somewhat larger diameter than the eyes 33 and 34, so that when it is in position it projects beyond the periphery of these eyes. When the bumper bars are assembled, the bolt which secures the bars together extends through the washer and holds it in place, while the faces of the washer form abutments which the edges of the eyes on the impact bars engage. The washer, therefore, insures that the bars will be properly spaced apart and that they will not tilt relative to each other.

Although a preferred embodiment of the invention has been illustrated and described, it should be understood that the invention is susceptible of various modifications within the scope of the appended claims.

Having thus described my invention what I claim is:

1. In a bumper end construction, a plurality of impact bars each having an eye on the end thereof, a rear bar having an eye on the end thereof, the eye on the rear being telescoped with eyes on the impact bars, spacing means between the ends of the eye on the rear bar and engaged by the adjacent edges of the eyes on the impact bars, and means for securing said eyes together.

2. In a bumper end construction, a plurality of impact bars each having an eye on the end thereof, each eye having a notch therein, a rear bar having its edges extending through said notches and an eye on the end thereof telescoped with the eyes on the impact bars, and a rib projecting from the periphery of the eye on the rear bar and engaged by the adjacent edges of the eyes on the impact bars, and means for securing said eyes together.

3. In a bumper end construction, a plurality of impact bars each having an eye at the end thereof, a rear bar having an eye interposed between and fitting partly within the eyes on the impact bars, the eye on the rear bar having an outwardly projecting circumferential rib therein, the edges of the eyes on the impact bars engaging said rib, and means for securing said eyes together.

4. In a bumper end construction, a plurality of impact bars each having an eye at the end thereof, said eyes each having a notch in one edge, a rear bar having its edges extending through said notches and a terminal portion interposed between and extending into the eyes on the impact bars, spacing means projecting from the periphery of the terminal on the rear bar and engaging edges of the eyes on the impact bars, and means for securing said eyes together.

5. In a bumper end construction, a plurality of impact bars each having an eye at the end thereof, a rear bar having an eye interposed between and extending into the eyes on the impact bars, means carried by and projecting from the periphery of the eye on the rear bar and engaging edges of the eyes on the impact bars, and a bolt extending through said eyes for securing the same in operative assembly.

6. In a bumper end construction, a plurality of impact bars each having an eye at the end thereof, a rear bar having an eye interposed between and partly within the eyes on the impact bars, the eye on the rear bar having an integral outwardly projecting rib thereon, edges of the eyes on the impact bars engaging said rib, and means extending through said eyes to maintain the eyes on the impact bars in engagement with said rib.

7. In a bumper end construction, a plurality of impact bars each having an eye at the end thereof, a rear bar having a terminal interposed between and partly within the eyes on the impact bars, the end of the rear bar being slotted, a member positioned in said slot and projecting beyond the periphery of the terminal on the rear bar, edges of the eyes on the impact bars engaging faces of said member, and means for securing said bars and said member in operative relation.

GEORGE W. VEALE.

DISCLAIMER 1,996,221.—*George W. Veale*, Cleveland Heights, Ohio. BUMPER. Patent dated April 2, 1935. Disclaimer filed October 31, 1935, by the assignee, *Eaton Manufacturing Company*.

Hereby enters this disclaimer to claim 1 of said Letters Patent.

[*Official Gazette November 19, 1935.*]